United States Patent
Lewallen et al.

(10) Patent No.: US 7,711,232 B2
(45) Date of Patent: May 4, 2010

(54) METHOD AND APPARATUS FOR TREATING A MATING PORTION OF A FIBER OPTIC CONNECTOR

(75) Inventors: Christopher P. Lewallen, Hudson, NC (US); James P. Luther, Hickory, NC (US); Randy C. Smith, Hickory, NC (US); Hieu V. Tran, Charlotte, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/998,630

(22) Filed: Nov. 30, 2007

(65) Prior Publication Data

US 2009/0142027 A1    Jun. 4, 2009

(51) Int. Cl.
*G02B 6/00* (2006.01)
*B08B 9/00* (2006.01)
(52) U.S. Cl. .................... 385/134; 134/22.1
(58) Field of Classification Search ............... None
See application file for complete search history.

(56) References Cited

U.S. PATENT DOCUMENTS

| | | | | |
|---|---|---|---|---|
| 4,035,210 A * | 7/1977 | Ohyoshi et al. | ............... | 216/24 |
| 4,544,413 A * | 10/1985 | Boots et al. | ........... | 106/287.14 |
| 6,905,251 B2 * | 6/2005 | Fujiwara et al. | ............... | 385/53 |
| 7,147,386 B2 * | 12/2006 | Zhang et al. | ................. | 385/85 |
| 2002/0162582 A1 * | 11/2002 | Chu et al. | .................. | 134/105 |

OTHER PUBLICATIONS

Corning Cable Systems, "PCC-001 Pocket Connector Cleaner," SRP-005-020, Issue 1, Nov. 2003, 1 page.
Corning Cable Systems, "Cleaning Connectors with the Universal Connector Cleaning Cassette (p/n 2104359-01) and the TKT-CCK Connector Cleaning Kit," SRP-006-073, Issue 3, Apr. 2002, 4 pages.

* cited by examiner

*Primary Examiner*—Omar Rojas
(74) *Attorney, Agent, or Firm*—Michael E. Carroll, Jr.

(57) ABSTRACT

A method and apparatus for treating a mating portion of a fiber optic connector for reducing an insertion force for the mating portion includes providing a mating portion of a fiber optic connector and treating the mating portion of the fiber optic connector by applying a cleaning and/or lubricating solution thereto to reduce the insertion force of the mating portion.

13 Claims, 13 Drawing Sheets

METHOD AND APPARATUS FOR TREATING A MATING PORTION OF A FIBER OPTIC CONNECTOR

BACKGROUND OF THE INVENTION

Fiber optic communication networks use fiber optic connectors to create nodes in the network where optical connections can be formed. Simply stated, using an optical connector creates a joining point that can be connected, disconnected, reconnected, and/or rerouted as desired. Fiber optic connectors can include ferrules configured for a single optical fiber or multiple optical fibers. Debris can be generated when mating/unmating ferrule-based connectors. This debris may create issues for fiber optic connectors. For instance, the debris may end up in guide pin bores of the multi-fiber connectors such as MT connectors after repeated mating and unmating. The build-up of debris may cause the pin to bore fit of the ferrule of the fiber optic connector ferrule to become increasingly tighter until eventually, the debris prevents the ferrule from fully engaging, which may affect optical performance. In extreme cases, the ferrule can break due to cocking of the ferrule during un-mating. One attempt to prevent these problems is to clean the connector by hand. As shown in FIG. 1, a connector 900 is cleaned in a conventional manner using a swab 901. However, swabbing is time consuming and its imprecision can result in missing portions of a connector face, bores and/or pins.

Thus, there is an unmet need for quickly and efficiently cleaning and/or lubricating the ferrule face, guide pin bores and/or pins of the fiber optic connector.

BRIEF SUMMARY OF THE INVENTION

In general, the various exemplary embodiments of the present invention and their equivalents provide simple and efficient tools to rapidly and thoroughly clean and lubricate fiber optic connectors to reduce insertion forces for mating portions of the fiber optic connectors.

According to various embodiments of the present invention, methods for treating a mating portion of a fiber optic connector for reducing an insertion force for the mating portion may include providing at least one mating portion of a fiber optic connector; mating a cleaning assembly to the mating portion, the cleaning assembly having a solution therein; and treating the mating portion by applying the solution to the mating portion. The solution serves to reduce the insertion force of the mating portion; for instance, after about fifty mating cycles, the insertion force is about 2 pounds of force or less after treating. The solution may include a lubricant and/or a cleaner. The lubricant, for instance, may be a silicone oil and the cleaner may be an alcohol. The lubricant may also be an index matching lubricant that provides beneficial index matching for the lubricant to act as a conduit for light to pass from optical fiber to optical fiber.

The mating portion of the fiber optic connector may be a ferrule bore, a ferrule alignment pin, a face of the ferrule, or the like. Treating may therefore include inserting a brush or a swab into the ferrule bore. Alternatively, or additionally, treating may include spraying the solution into the ferrule bore. After treating, excess solution and/or dislodged debris may be wiped from a ferrule face of the fiber optic connector.

In another embodiment according to the invention, an apparatus for treating a fiber optic connector for reducing an insertion force includes a cleaning dispenser; a solution reservoir in communication with the cleaning dispenser; and a solution disposed in the solution reservoir. The solution may be applied by the cleaning dispenser to a mating portion of a fiber optic connector that aids in reducing an insertion force for the fiber optic connector. The cleaning dispenser may be configured to convert the solution into an aerosol, which cleans and lubricates the mating portion.

In yet another embodiment of the invention, an apparatus for treating a mating portion of a fiber optic connector for reducing an insertion force for the mating portion includes a cleaning element and a solution reservoir. The solution reservoir may be filled and refillable with a cleaning and/or lubricating solution, which may be applied to the cleaning element by osmosis, pumping action, capillary action or the like.

In this example, the cleaning element may be a brush, a swab or similar structure, and a resilient element may be provided to bias the cleaning element into contact with a ferrule bore, a ferrule alignment pin and/or a ferrule face. Moreover, multiple cleaning elements may be provided, which have brushes with a predetermined spacing between the brushes for simultaneously fitting into complementary bores of the fiber optic connector. Additionally, a cleaning strip may be provided for wiping a ferrule end face.

In a further embodiment of the invention, an apparatus for treating a mating portion of a fiber optic connector for reducing an insertion force may include multiple cleaning elements such as brushes having predetermined spacings therebetween for simultaneously fitting into complementary bores of the fiber optic connector; and a solution reservoir. The cleaning elements may extend from or near the solution reservoir such that the solution can be applied to the cleaning elements. A resilient element may be provided for biasing the cleaning elements, and a cleaning strip may be provided in this embodiment for wiping a ferrule end face.

Evident from the foregoing introduction, the component parts of the exemplary embodiments and their equivalents are simple and economical to manufacture and use. Other advantages of the invention will be apparent from the following description and the attached drawings, or can be learned from practice of the invention.

BRIEF DESCRIPTION OF THE DRAWINGS

The foregoing and other features, aspects and advantages of the present invention will be better apparent from the detailed description below in combination with the drawings, in which.

Figure 1:
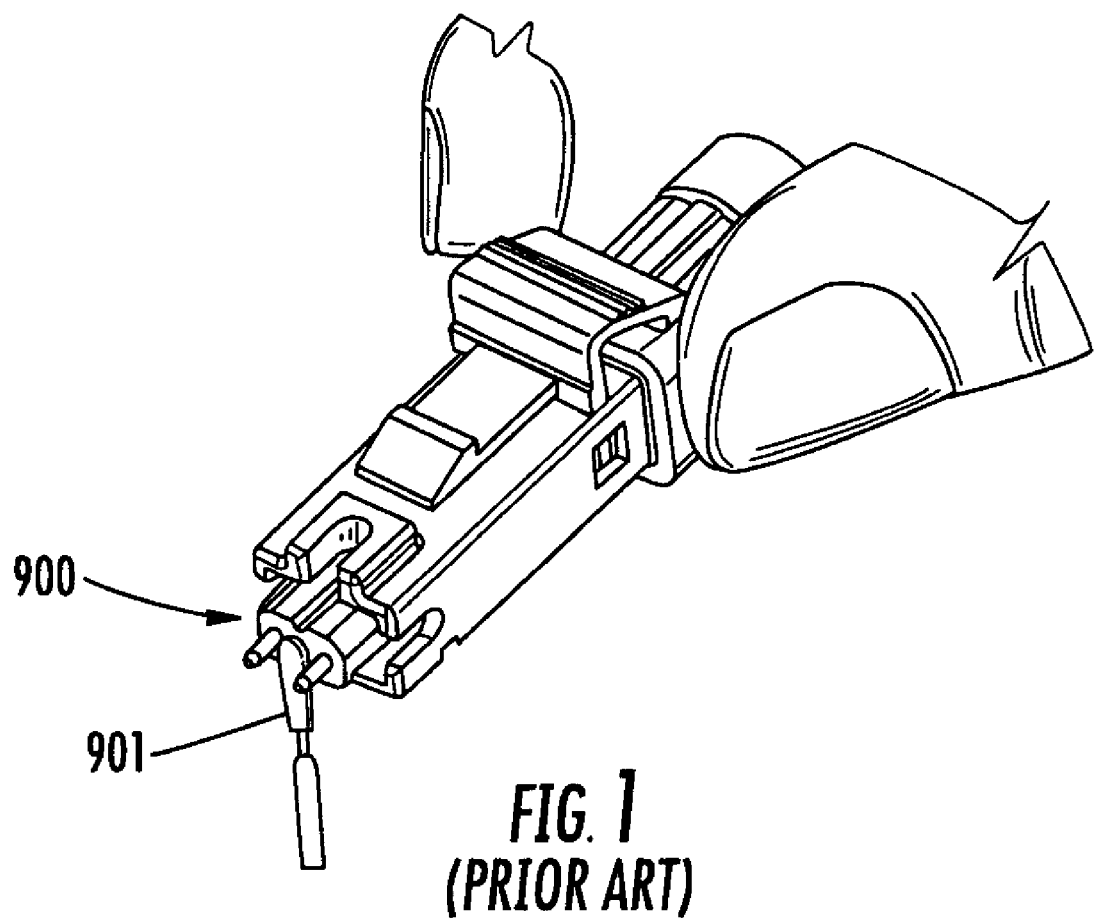
FIG. 1 is a perspective view of a conventional process of cleaning a fiber optic connector.

Detailed reference will now be made to the drawings in which examples embodying the present invention are shown. The detailed description uses numerical and letter designations to refer to features of the drawings. Like or similar designations of the drawings and description of the several views refer to like or similar parts of various embodiments according to the invention.

DETAILED DESCRIPTION OF THE INVENTION

The drawings and detailed description provide a full and detailed written description of the invention and of the manner and process of making and using various embodiments, so as to enable one skilled in the pertinent art to make and use them, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

Turning now to the figures, according to one aspect of the invention a guide pin and bore cleaner assembly for cleaning and lubricating a mating portion of a fiber optic connector for reducing an insertion force is broadly embodied in FIGS. 2-8 and designated in general by the element number 10. The guide pin and bore cleaner assembly 10 generally includes a canister 12, which holds and is refillable with a fluid 14 for cleaning and lubricating portions of a fiber optic connector 16, as will be described in detail below.

Figure 2:
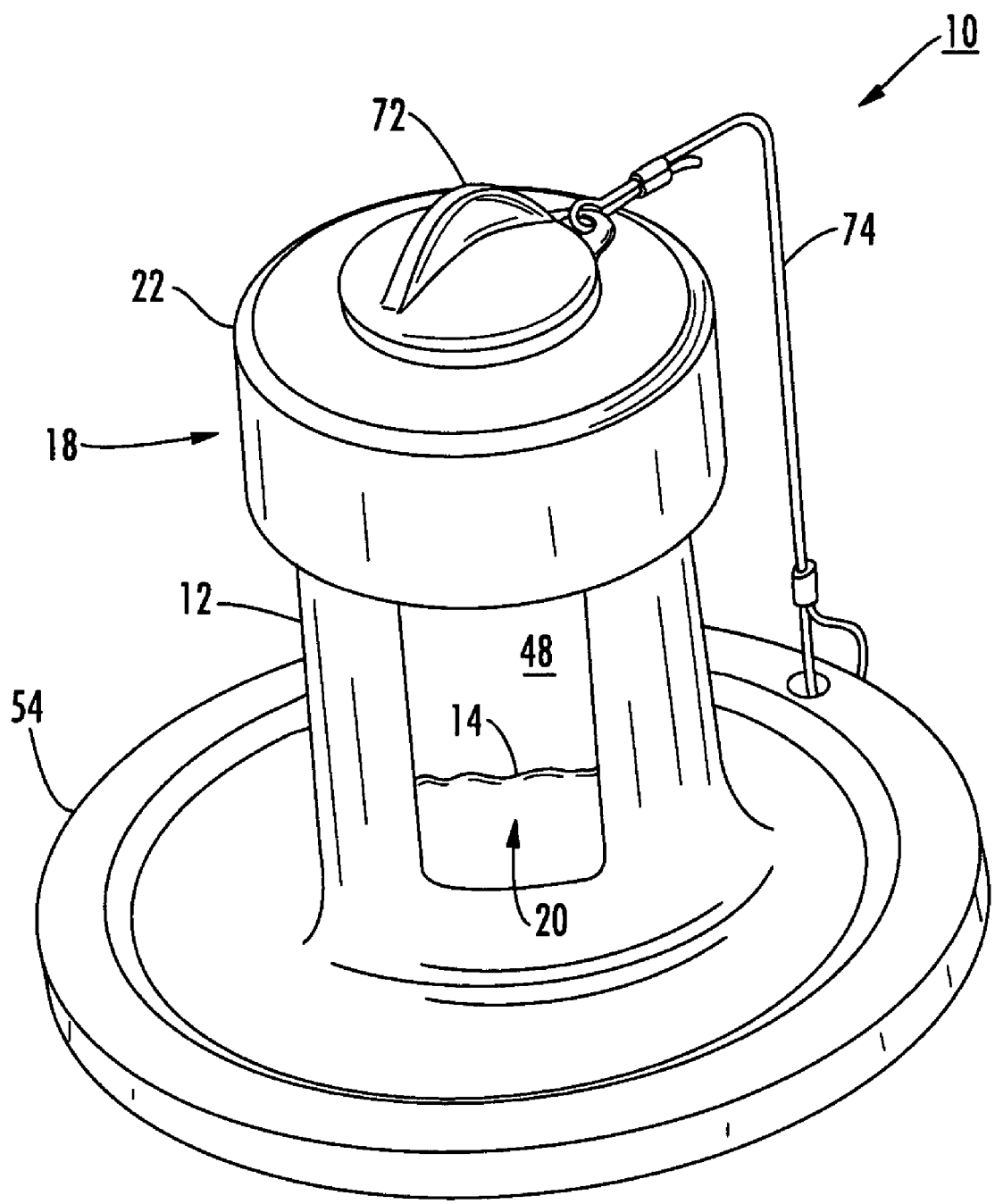
FIG. 2 is a perspective view of an apparatus for treating a mating portion of a fiber optic connector.
Figure 3:
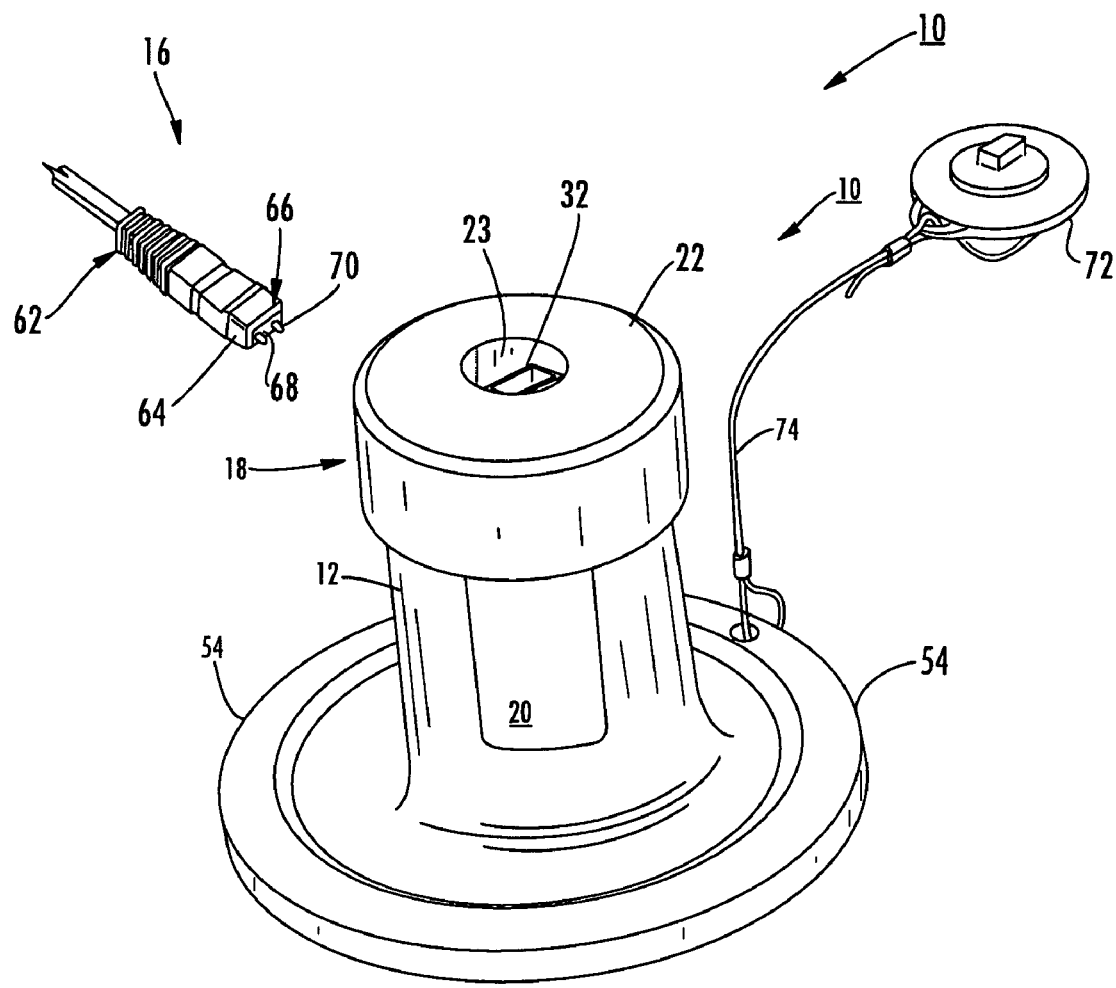
FIG. 3 is another perspective view of the apparatus in FIG. 2.

With reference to FIGS. 2 and 3, the assembly 10 may include a cap assembly 18 connected to the canister 12 by press-fit devices, snap-fit devices, screws and combinations of these and other such devices and mechanisms. As shown in FIG. 2, for instance, the canister 12 may include a viewing window 48 through which the fluid 14 in a reservoir 20 may be observed. If a technician observes that the fluid 14 is depleted, the technician may refill the reservoir 20 with additional fluid 14 for reuse.

With particular reference to FIG. 3, a cap 22 may have an aperture 23 to hold and protect a ferrule face pocket 32. The ferrule face pocket 32 is shaped to complement a ferrule or plug 64 of the fiber optic connector 16. As shown, the fiber optic connector 16 may include an optic fiber cable and strain relief boot 62 connected to the ferrule or plug 64 in a known manner. The ferrule also includes a ferrule face 66, which may have one or more ferrule bores 68 and/or one or more guide pins 70, depending on the type of connector. As used herein the phrase "mating portion" may refer to and include any or all of the ferrule or plug 64, its face 66, its bores 68, and/or its pins 70.

With reference to both FIGS. 2 and 3, the assembly 10 may further include a bottom 54 that may be used as a grip or stand during use of the assembly 10. By way of brief introduction, the technician may remove a stopper 72 from the ferrule face pocket 32 prior to inserting the fiber optic connector 16 into the aperture 23 of the cap 22. As shown, the stopper 72 is shaped complementary to the aperture 23 and may be sized to achieve a press-fit in the aperture 23, or mechanical connections such as combinations of keys and keyholes may be used to connect the stopper 72 to the aperture 23. The stopper 72 may be made of rubber or other elastomeric material to provide cushioning and protection for the ferrule face pocket 32. A lanyard, string, wire or the like, designated in general by the element number 74, may be used to maintain a connection between the canister 12 and the stopper 72. In this example, the lanyard 74 is attached to the bottom 54 and to the stopper 72 by loops or holes formed in the components. However, those skilled in the art will understand that the stopper 72 could be attached to the canister 12 in various other ways such as by a hinge arrangement disposed, for instance, on a portion of the cap 22 to hinge together the cap 22 and the stopper 72.

Figure 4:
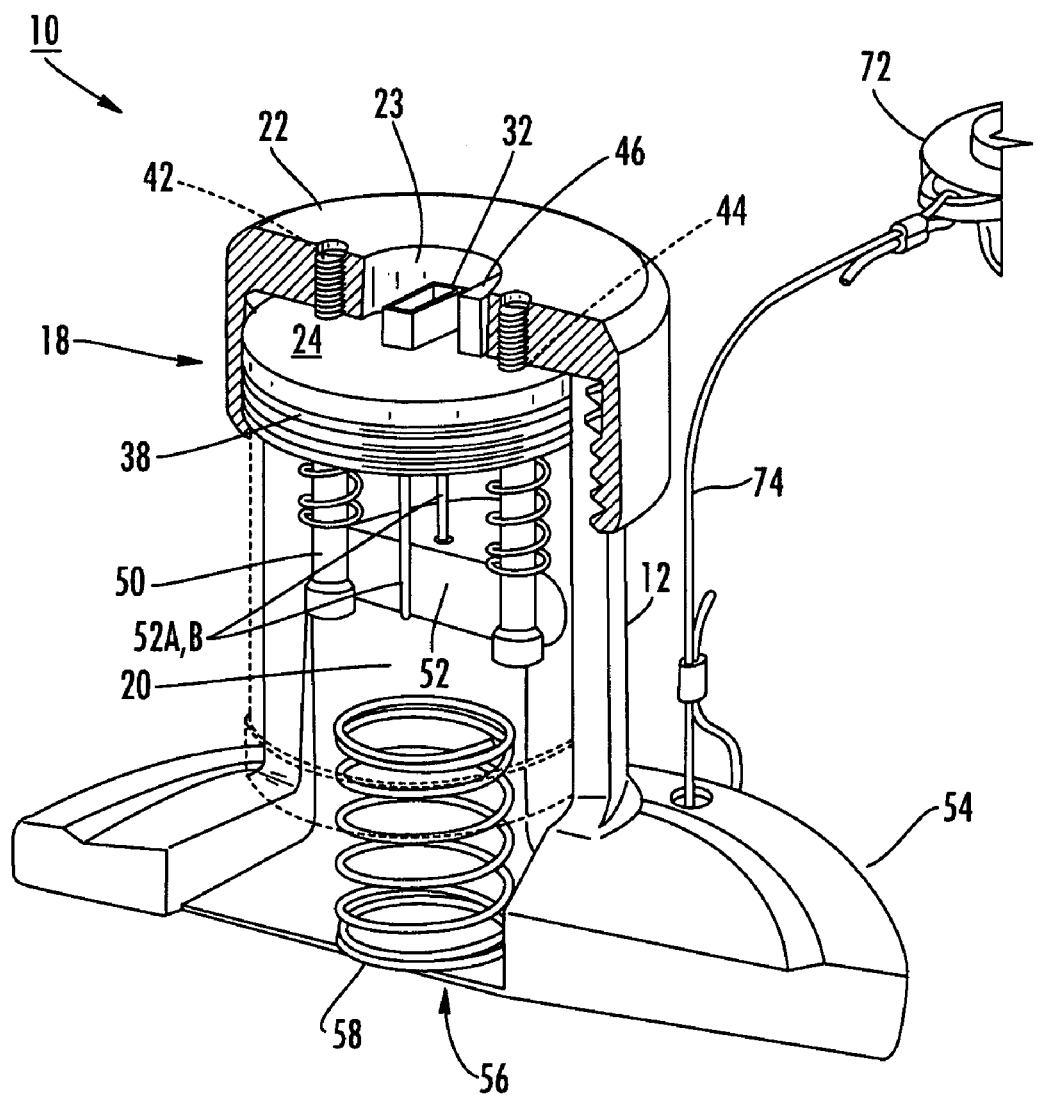
FIG. 4 is a partial perspective and cross-sectional view of the apparatus in FIG. 2.

Turning now to FIG. 4, a more detailed partial cross-sectional view of the assembly 10 is shown. In this perspective, a cap assembly 18 is more clearly revealed to include the cap 22, which in this example is screwed onto the canister 12, and attached to a containment top 24 by one or more spring-loaded rods or screw assemblies 50. As shown, the assemblies 50 screw into and extend through a body 38 of the containment top 24 through respective apertures 42 and 44. Also shown, the assemblies 50 extend through a brush assembly 52, which will be described in detail with respect to FIG. 6 below.

FIG. 4 also shows a key 46, which in this example is located near the ferrule face pocket 32. As will be described by way of exemplary operation below, the key 46 helps to ensure that the fiber optic connector 16 is properly aligned within the aperture 23 of the cap 22 to assure thorough cleaning of the ferrule bore 68 and/or the ferrule alignment pin 70. FIG. 4 further shows a plunger assembly 56, which includes a resilient element 58 such as a spring or the like. The plunger assembly 56 may be depressed by the technician once the fiber optic connector 16 is inserted in the ferrule face pocket 32 in order to project one or more cleaning elements 52A, 52B such as brushes into the bores 68 as will be described with respect to FIGS. 7 and 8 below. The resilient element 58 has a spring constant that urges the plunger assembly 56 into an open position or state as shown in FIG. 4 until a depression force provided by the technician overcomes the spring constant.

Figure 5:
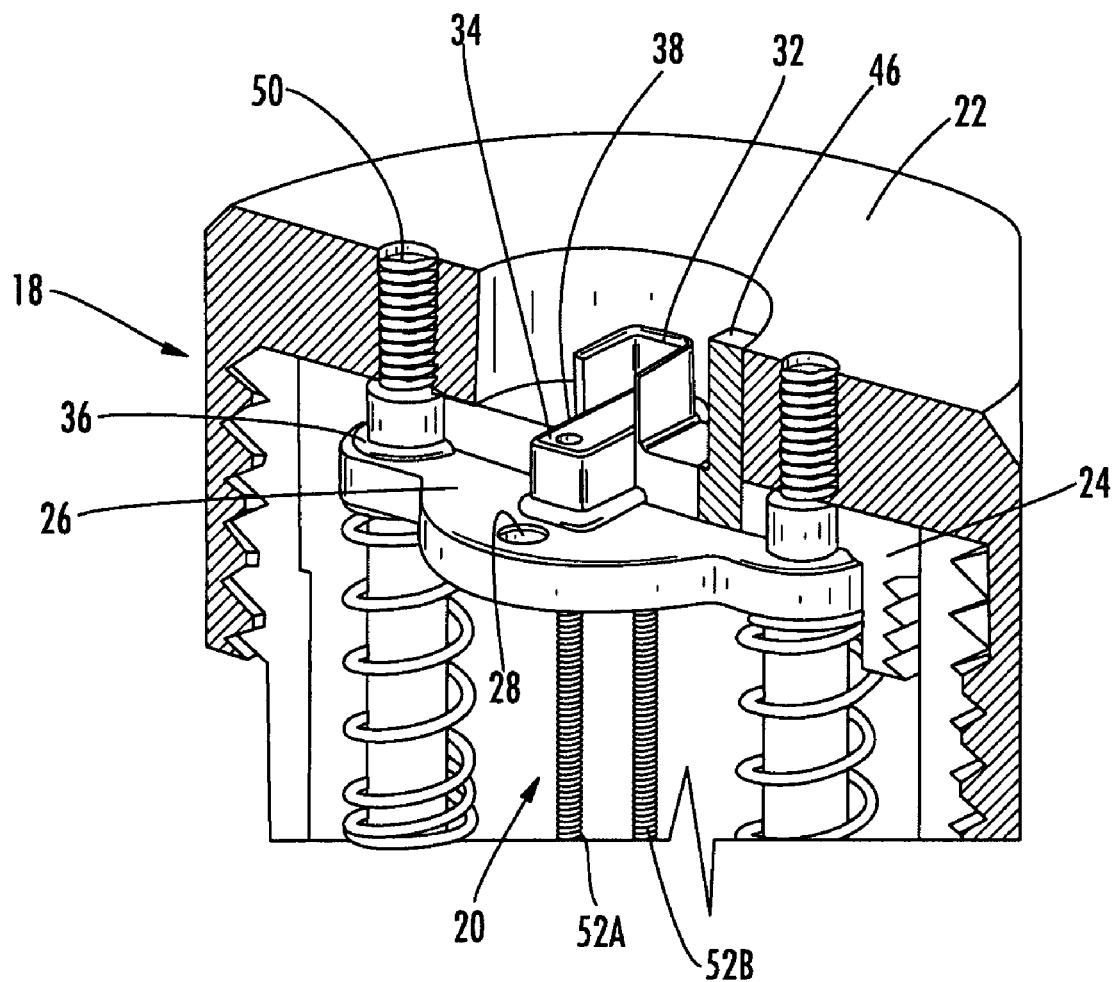
FIG. 5 is a detailed perspective and cross-sectional view of the apparatus as in FIG. 4.
Figure 6:
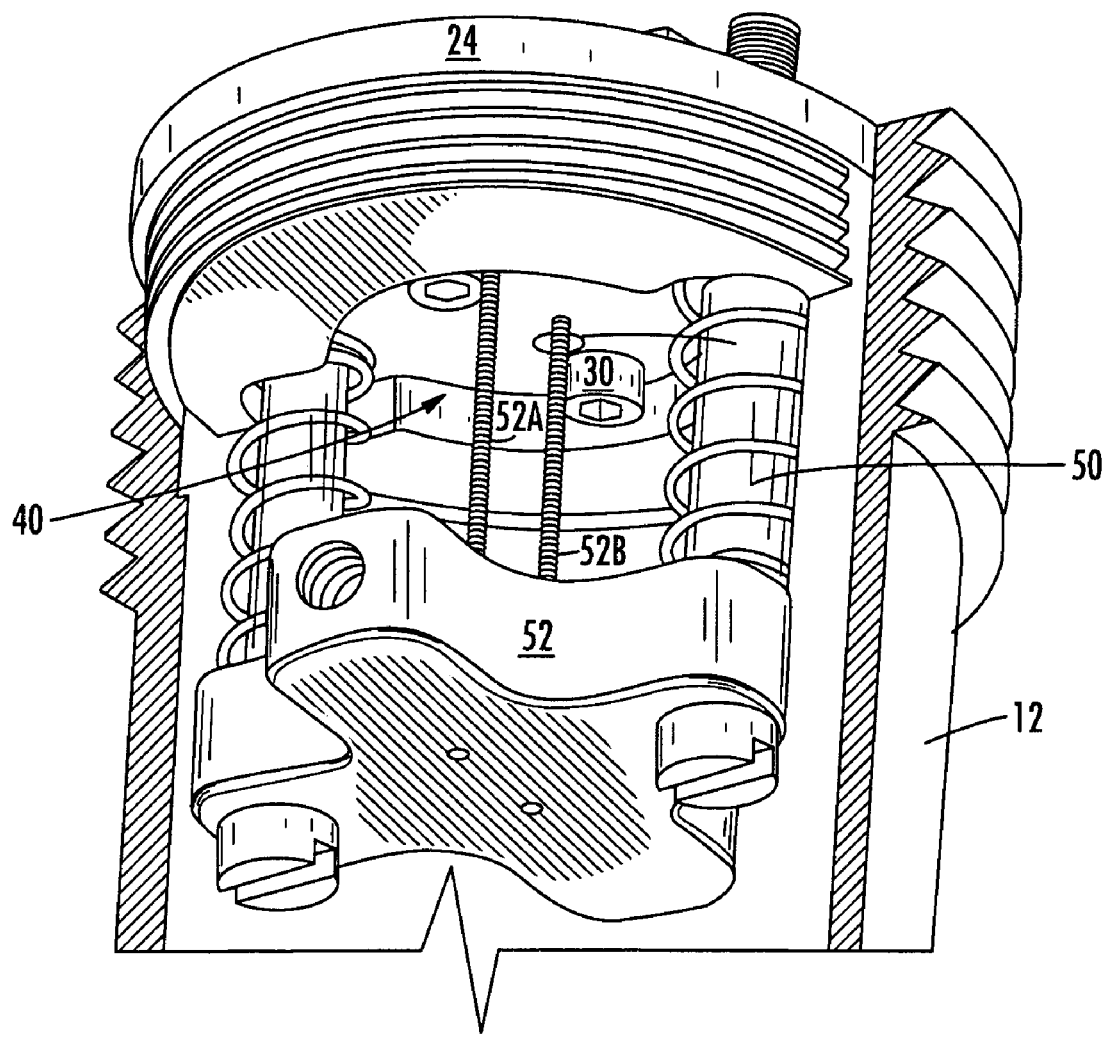
FIG. 6 is another detailed perspective and cross-sectional view of the apparatus in FIG. 4.

FIGS. 5 and 6 clearly show additional aspects of the cap assembly 18. For instance, a surface 26 is shown in this partial cut-away view. The surface 26 includes one or more sockets 28 through which fasteners 30 are screwed or inserted to hold the surface 26 in a depression 40 of the containment top 24. As further shown, a projection 34 is formed in this example on the surface 26. The projection 34 is complementary to the ferrule face pocket 32 introduced above. The ferrule face pocket 32 and the projection 34 operate to ensure that the cleaning elements 52A, 52B such as brushes, swabs, or the like are aligned properly and also maintain brush alignment during multiple cleanings and lubrications of multiple fiber optic connectors 16. In this example, the projection 34 includes guide holes 38 through which the cleaning elements 52A, 52B project during cleaning and lubricating steps, thereby providing the proper spacing so they enter the bores of the fiber optic connector.

FIG. 5 particularly shows one or more sealing elements 36, such as o-rings, disposed between portions of the surface 26 and the containment top 24 to ensure that the fluid 14 (see FIG. 2) in the reservoir 20 does not escape from the reservoir 20 except upon the cleaning elements 52A, 52B. Those skilled in the art will appreciate that the sealing elements 36 may be disposed about or between other portions and surfaces of the various components and are not limited to the illustrated examples.

FIG. 6 particularly shows the guide holes 38 through which the cleaning elements 52A, 52B extend, and each of the rods 50 are spring-loaded as noted above. Also, the brush assembly 52, to which the cleaning elements 52A, 52B are attached, is shown most clearly in FIG. 6. The skilled artisan will understand that the brush assembly 52 is not limited to dual components. More particularly, fewer or additional brushes may be provided to accommodate a variety of connectors. Additionally, the brushes may include apertures or other modifications to allow fluid 14 to spray into or onto the ferrule face 66 under pressure to provide additional cleaning. Thus, the exemplary embodiment is not intended as limiting of the invention.

Figure 7:
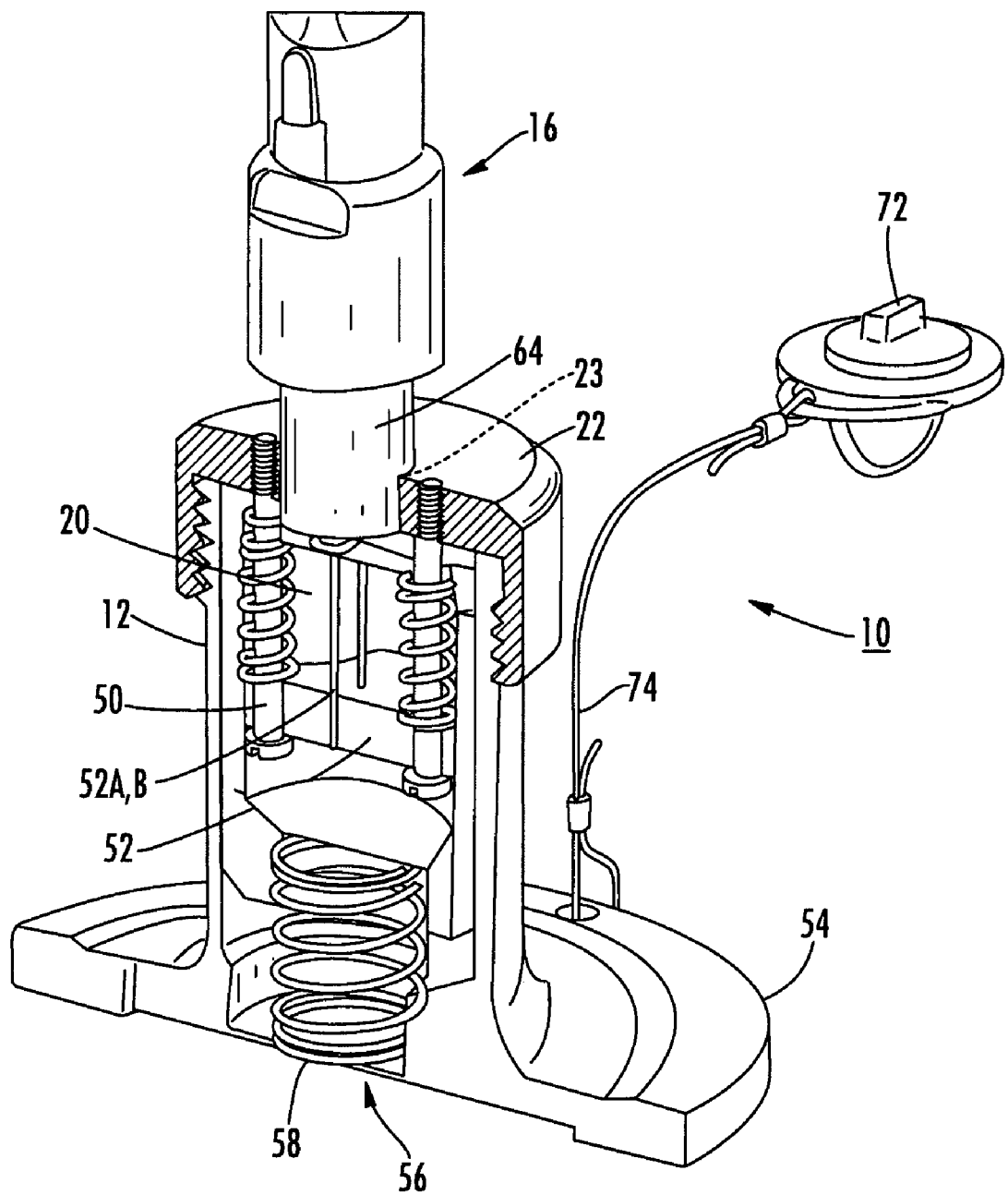
FIG. 7 is a partial perspective and cross-sectional view of the apparatus of FIG. 2 being mated with the fiber optic connector, particularly showing a pre-cleaning and lubricating step.
Figure 8:
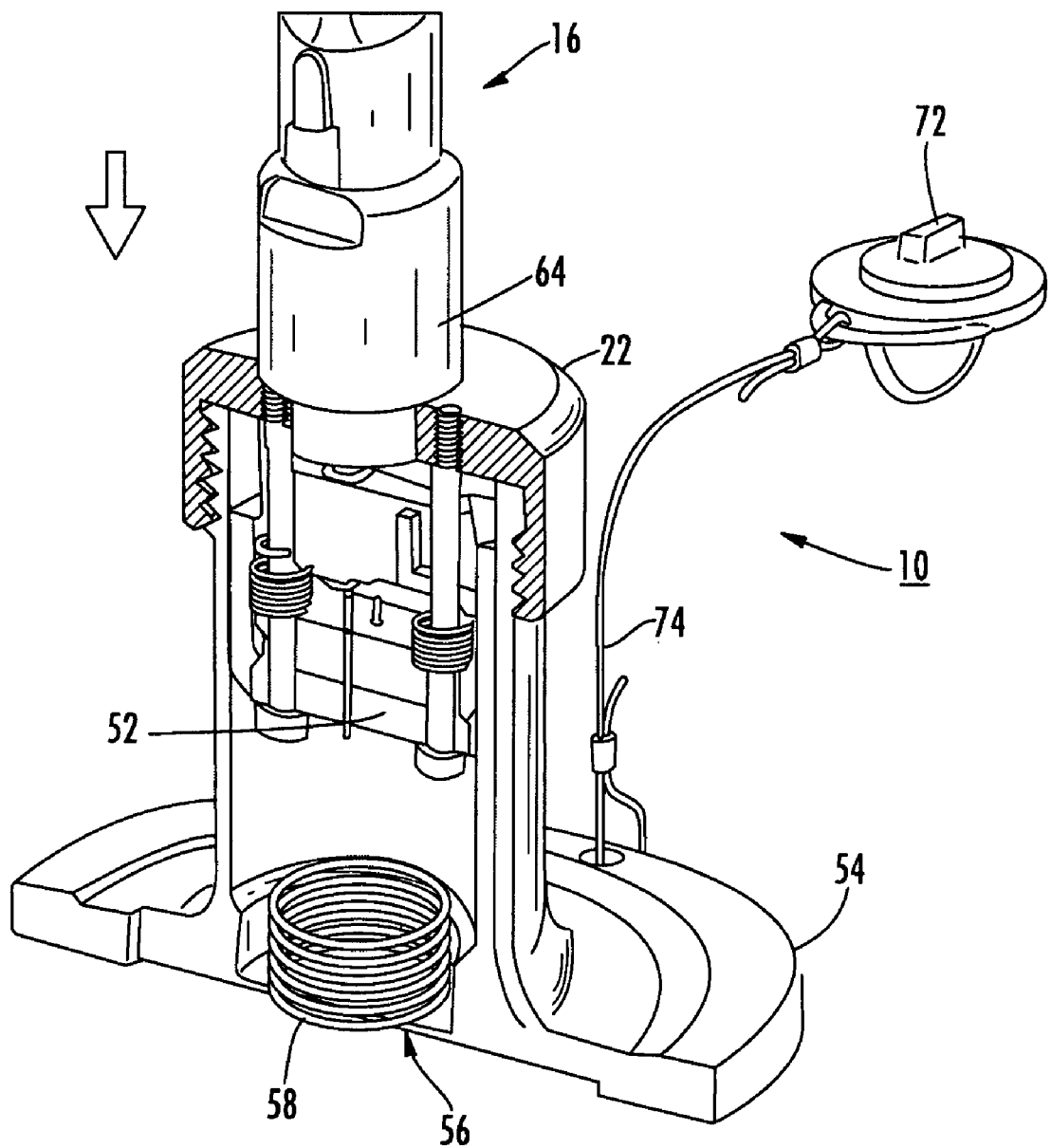
FIG. 8 is a partial perspective and cross-sectional view of the apparatus as in FIG. 7, particularly showing a cleaning and lubricating step.

Turning now to FIGS. 7 and 8, the invention may be better understood with reference to an exemplary method of using the guide pin and bore cleaner assembly 10 introduced above.

With reference to FIG. 7, the ferrule or plug 64 of the fiber optic connector 16 is inserted into the aperture 23 of the cap 22. As shown, the resilient element 58 is in a relaxed state or condition; thus, the cleaning elements 52A, 52B of the brush assembly 52 are also in a relaxed state. In other words, the cleaning elements are not extended for cleaning. Additionally, in the relaxed state device 10 can be shaken to wet the cleaning elements with fluid and/or clean debris off the cleaning elements before using.

Turning to FIG. 8, the technician pushes the fiber optic connector 16 downward as indicated by the large down arrow. This action overcomes the spring constant of the rods 50 and the resilient element 58 to compress the springs and cause the cleaning elements 52A, 52B to slide into the bores 68 of the fiber optic connector 16 (see FIG. 3). More specifically, the bores 68 in this example slide over and around the cleaning elements 52A, 52B. The technician may repeat this action multiple times, preferably 2 to 5 times, in order to thoroughly clean and lubricate the bores 68. It will be appreciated that the exemplary construction and method shown in FIGS. 7 and 8 may be reversed. Specifically, the plunger assembly 56 may be arranged to "push up" toward the ferrule or plug 64 of the fiber optic connector 16 rather than as described above.

In the example shown in FIGS. 7 and 8, the fluid 14 (see FIG. 2) may be a solution including a quantity of silicone index matching oil for lubrication and/or alcohol for cleaning. After cleaning and lubricating, the lubricant and cleaner fluid 14 will counteract debris build-up and prevent connector fits from becoming tight thus preventing issues such as cocking of the ferrule or plug 64 when de-mating and the like. Should the fluid 14 migrate into a fiber-to-fiber interface, the fluid 14 will not result in adverse consequences such as refraction or light impedance but should provide beneficial index of refraction matching between about 1.3 to about 1.6. Stated another way, any fluid 14 that might remain on fiber end faces will act as a conduit for light to pass from fiber to fiber. Although the fluid 14 may be a silicone oil and an alcohol mixture as noted above to reduce insertion force for the fiber optic connector 16 to about two (2) pounds of force or less after treatment, the skilled artisan will appreciate that other lubricants other than silicone oil and other cleaners other than alcohol, may be used alone or in combination.

Figure 9:
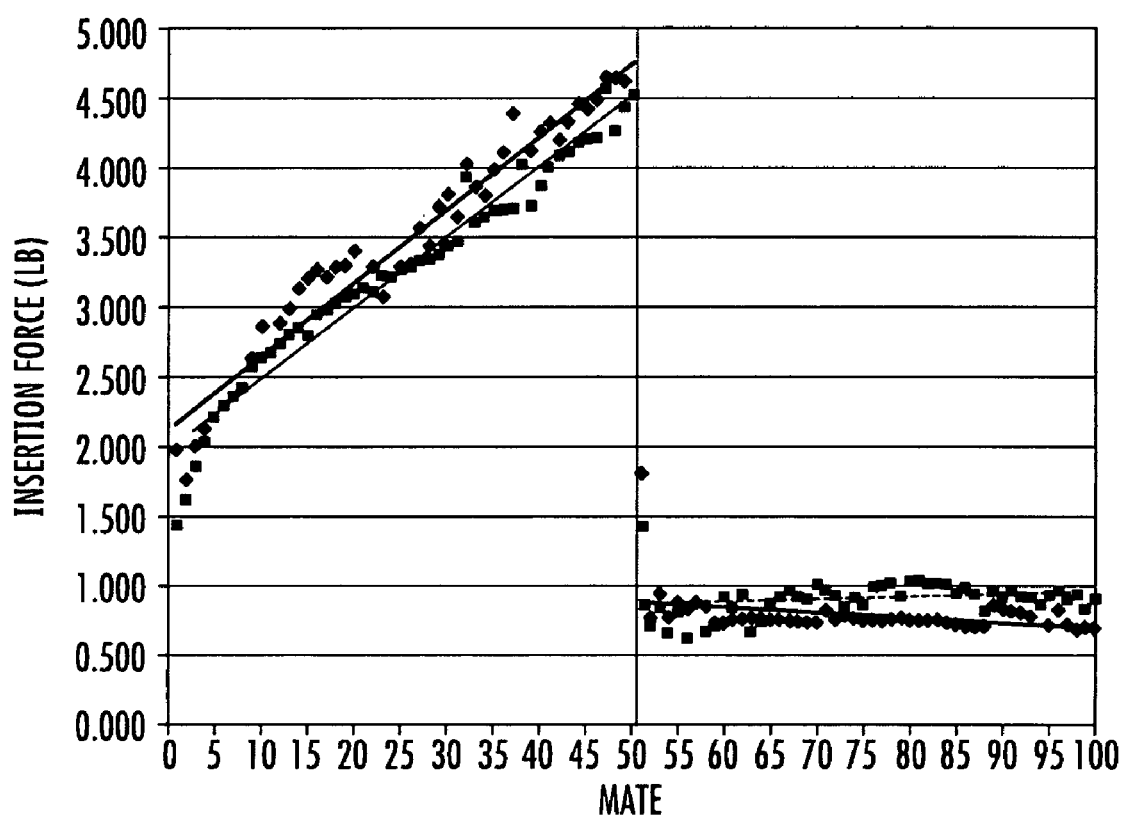
FIG. 9 is a chart illustrating a plurality of fiber optic connectors undergoing matings with and without cleaning and lubricating treatments according to an aspect of the invention.

Turning to the left hand side of the chart in FIG. 9, results of untreated connectors being cycled through 50 matings are shown. Without bore cleaning and without a lubricant, insertion forces dramatically increase as shown on the left side of the chart. On the right side of the chart, another 50 mating cycles are shown that have followed cleaning and lubrication treatments using the exemplary cleaner assembly 10. The right side of the chart clearly shows very stable and lower insertion forces.

Figure 10:
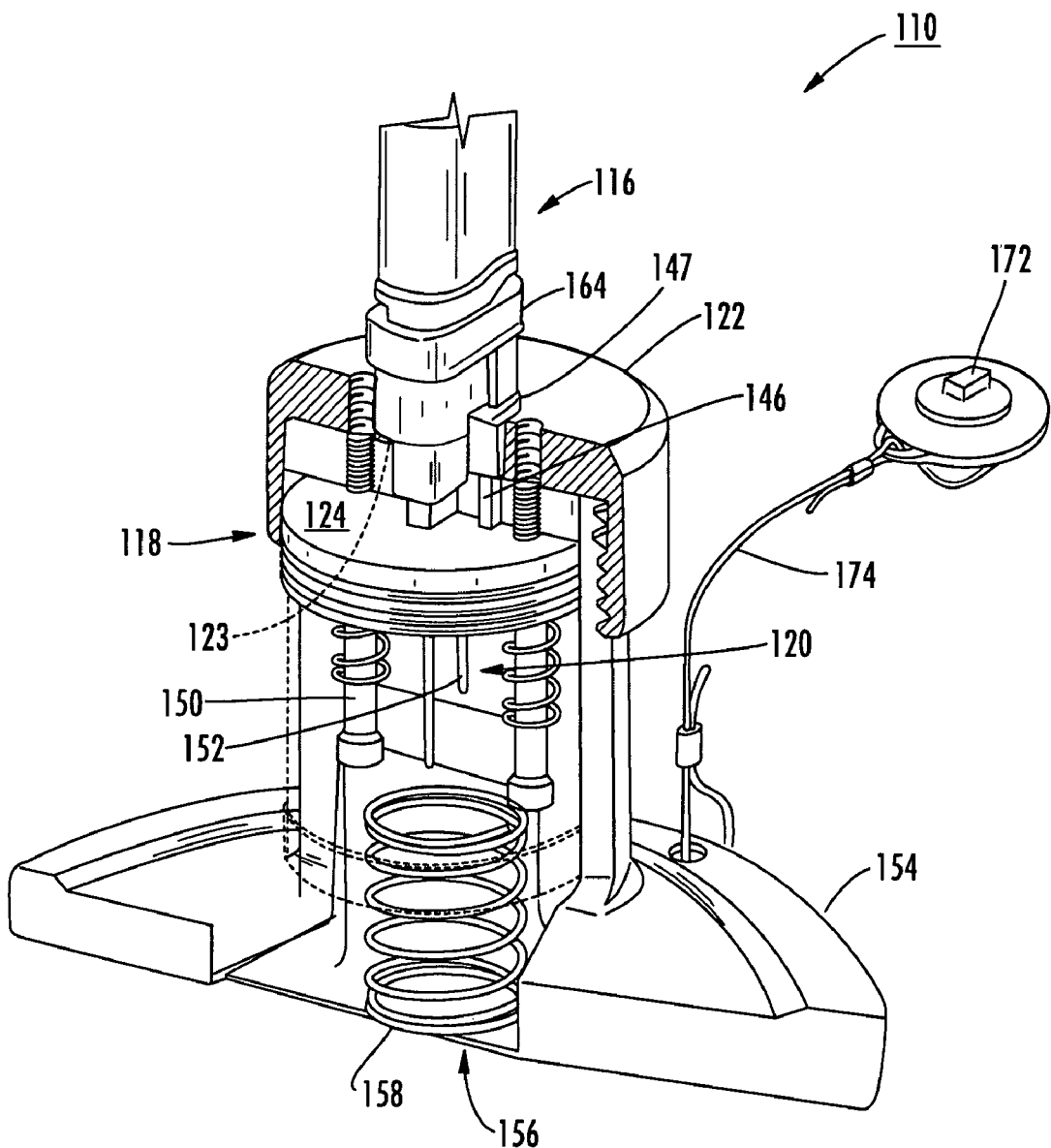
FIG. 10 is a partial perspective and cross-sectional view of another embodiment of an apparatus for treating a fiber optic connector according to the invention.

With reference now to FIG. 10, another embodiment according to the invention includes an apparatus for treating a mating portion of a fiber optic connector, broadly designated by the element 110, which is similar in some ways to the embodiment described above. The exemplary assembly 110 is particularly useful for a fiber optic connector variant 116 such as the MTP® fiber optic connector 116 available from Corning Cable Systems, Hickory, N.C. As shown, a cap assembly 118 is connected to a bottom 154 by press-fit devices, snap-fit devices, screws and combinations of these and other such devices and mechanisms. A reservoir 120 for cleaning fluid is formed within the bottom 154. A cap 122 overlies a containment top 124, which encloses the reservoir 120. The reservoir 120 is further enclosed with a stopper 172 when the apparatus 110 is not in use. Stopper 172 is shaped to fit into a complementary shaped aperture 123 in the cap 122.

As shown in FIG. 10, a ferrule or plug 164 of the fiber optic connector 116 is inserted in the aperture 123 and aligned by a key 146 and an insert adaptor 147. The key 146 ensures that the fiber optic connector 116 is properly aligned within the aperture 123 to assure thorough cleaning of a ferrule bore and/or a ferrule alignment pin of the fiber optic connector 116. The insert adaptor 147 enables the use of one assembly 110 to interface with both MTP® brand ferrules and other fiber optic connector such as described hereinabove. Thus, the adaptor 147 may be removed to use the assembly 110 with other types of connectors.

FIG. 10 further shows rods 150 and a resilient element 158 of a plunger assembly 156, which are similar in some ways to the foregoing descriptions. For example, spring constants of these components are overcome by pushing action to cause brushes of a brush assembly 152 to slide into the bores of the fiber optic connector 116 (see, e.g. FIG. 3). The technician may repeat this action multiple times, preferably 2 to 5 times, in order to thoroughly clean and lubricate the bores and/or pins of the fiber optic connector 116.

Figure 11:
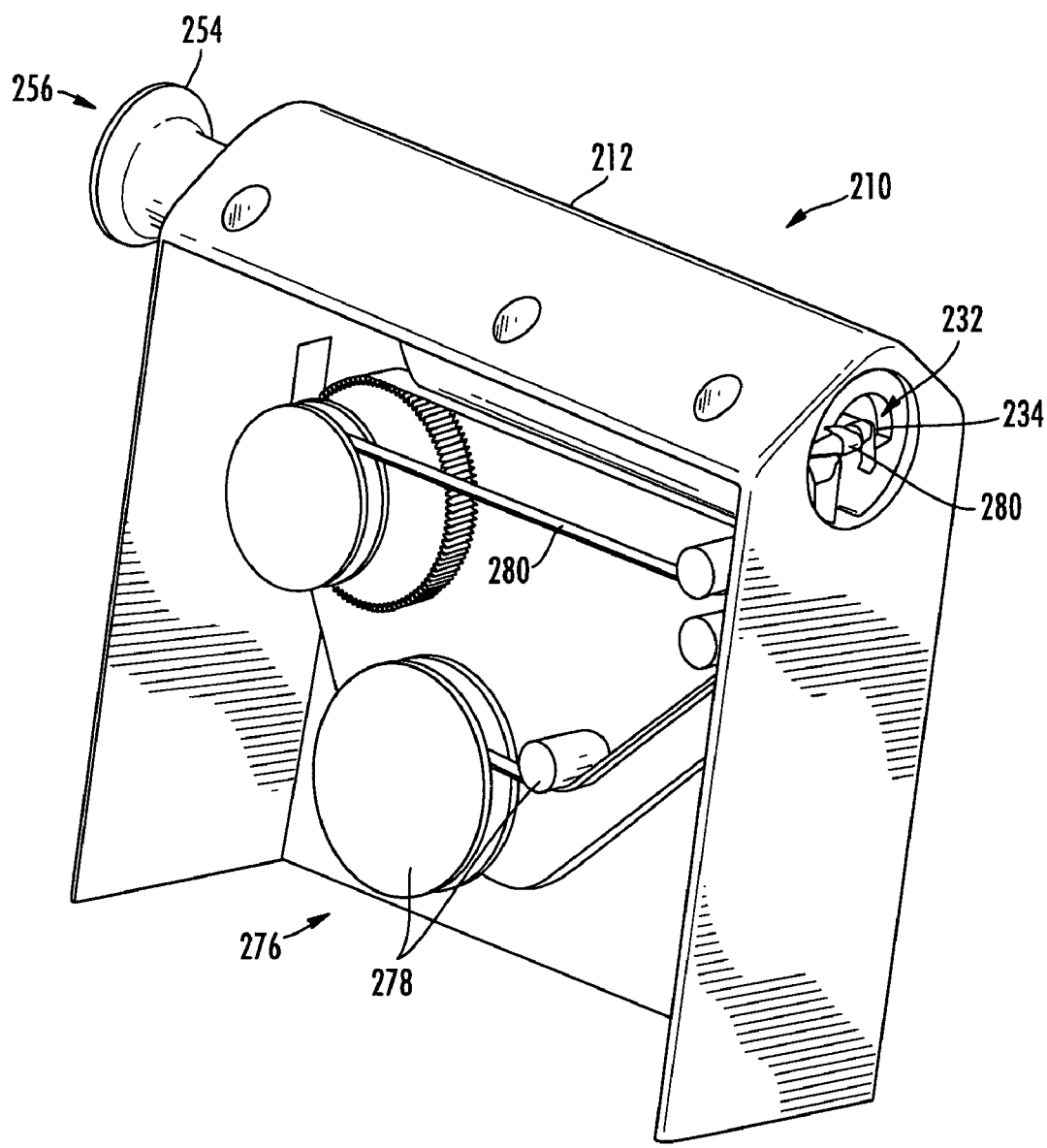
FIG. 11 shows a partial perspective of a third embodiment of the invention, particularly showing a tape for wiping a fiber optic connector after a cleaning and lubricating treatment according to a further aspect of the invention.

Turning to FIG. 11, another embodiment of an apparatus for treating a mating portion of a fiber optic connector is shown, which is designated in general by the element number 210. In this example, a housing 212 of the assembly 210 includes a modified reservoir (cf. reservoir 20 in FIG. 2). As shown, the assembly 210 includes a tape cassette 276 having a plurality of guides and rollers 278 upon which and through which a cleaning strip or tape 280, such a micro-denier cloth, may be cycled in order to clean fiber faces after guide pin bores have been cleaned as previously described (see, e.g., bores 68 of FIG. 3). More specifically, a fiber optic connector, such as one of those described herein, may be mated to a ferrule face pocket 232. Pins of the connector are aligned and inserted in respective guide holes 234 of the assembly 210. The technician may grasp a grip 254 of the assembly 210 to activate a plunger assembly 256 to overcome spring constants and cause brushes to slide into the bores of the fiber optic connector 116 (cf. FIGS. 3, 7 and 8). The technician may repeat this action multiple times, preferably 2 to 5 times, in order to thoroughly clean and lubricate the bores and/or pins of the fiber optic connector 116. Although the fluid includes an indexing matching silicone lubricant that will not interfere with light transfer, use of the tape 280 may be desirable simply to remove excess fluid and/or to remove any debris.

Figure 12:
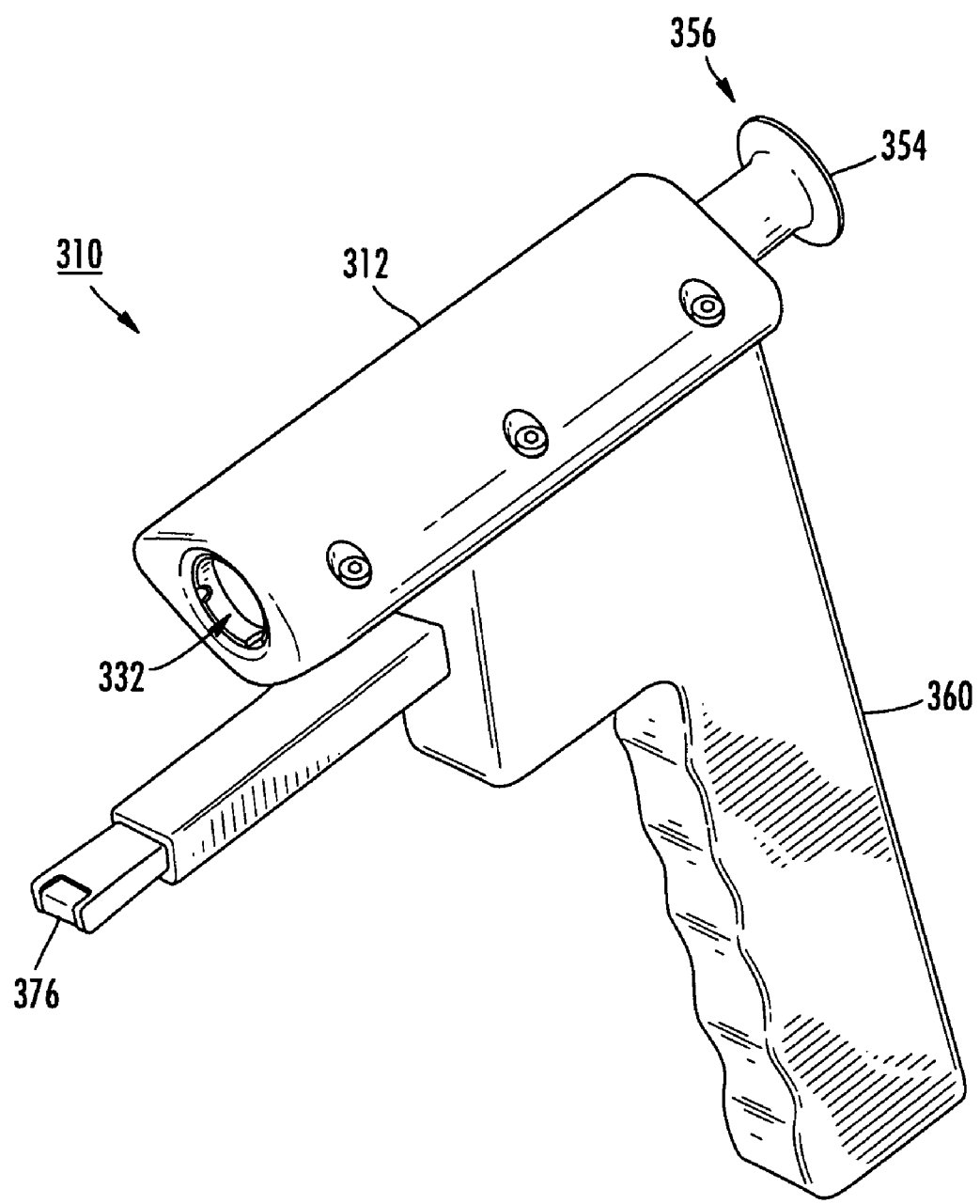
FIG. 12 is a perspective view of a fourth embodiment of an apparatus for treating a fiber optic connector according to the invention.

FIG. 12 shows another embodiment of an apparatus for treating a mating portion of a fiber optic connector according to the invention. As shown, a cleaning assembly 310 includes a housing 312 having a handle 360 to which a tape assembly 376 is attached beneath the housing 312 in this example. The housing 312 holds a cleaning and lubricating fluid such as described above, and the tape assembly 376 operates in a manner similar to the embodiment described immediately above. As further shown, a button 354 of a plunger assembly 356 may be used to activate or convert the fluid into an aerosol, which can be sprayed onto a brush or into a ferrule bore after the bore has been cleaned initially by the brush. Additionally, or in lieu of brushes, the button 354 may simply be activated to dispense a high pressure aerosol by a dispenser 332 onto a ferrule face and/or into ferrule bores of the connector.

Figure 13:
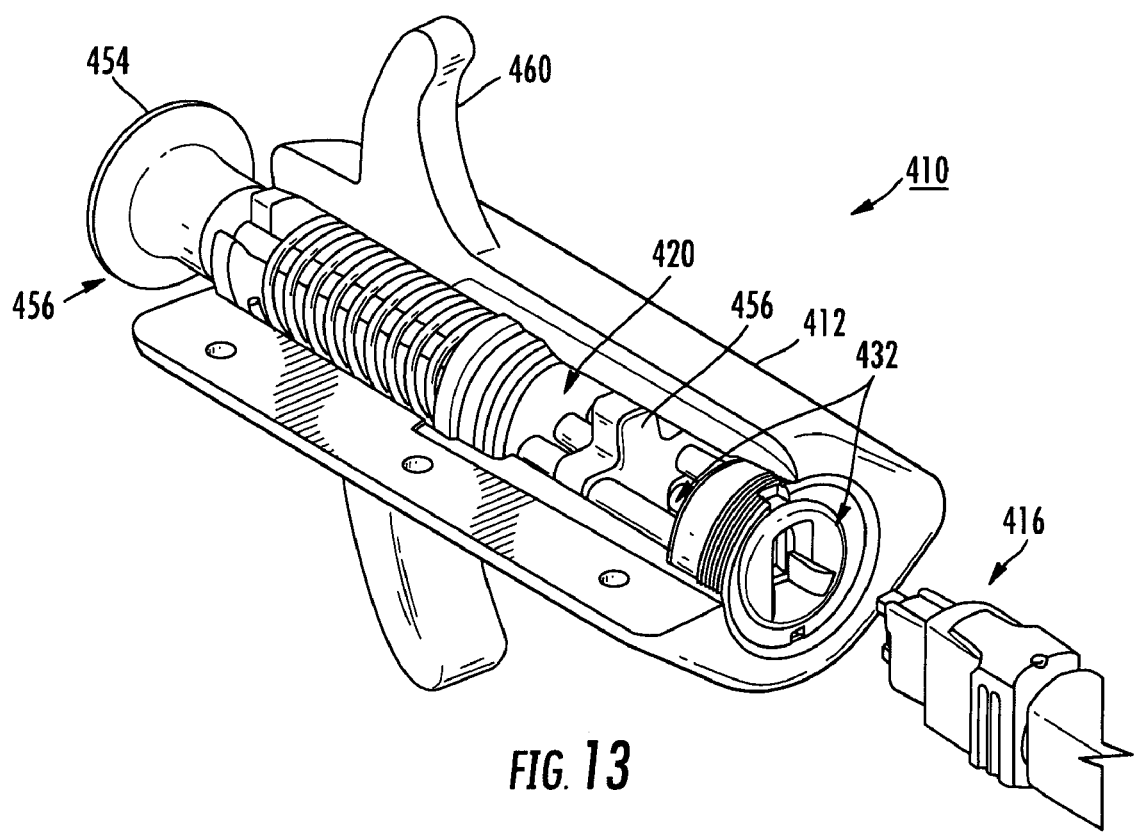
FIG. 13 is a partial perspective and cross-sectional view of a fifth embodiment of an apparatus for treating a fiber optic connector according to the invention.

Turning to FIG. 13, an additional embodiment of a fiber optic connector cleaning assembly is shown. The assembly, designated 410, includes a handle 460 extending from a body 412 of the assembly 410 to permit the technician to operate the assembly 410 in a hypodermic-like fashion to clean a fiber optic connector 416. In this variation, the assembly 456 may receive a cleaning and lubricating solution (such as fluid 14 described above) from a reservoir 420 and convert the solution to an aerosol by forcing the solution under pressure through a dispenser 432. The aerosol can thus be used with or without a brush or other cleaning element.

The foregoing is a description of various embodiments of the invention that are provided here by way of example only. Although the cleaning and lubricating devices have been described according to presently preferred embodiments and examples thereof, other embodiments and examples may perform similar functions and/or achieve similar results for cleaning and lubricating a variety of fiber optic connectors, and in particular their mating portions. All such equivalent embodiments and examples are within the spirit and scope of the present invention and are intended to be covered by the appended claims and their equivalents. Moreover, although specific terms are employed herein, they are used in a generic and descriptive sense only and are not for purposes of limitation.

That what is claimed is:

1. A method for treating a mating portion of a fiber optic connector for reducing an insertion force for the mating portion, the method comprising:
    providing at least one mating portion of a fiber optic connector;
    mating a cleaning assembly to the at least one mating portion, the cleaning assembly having a solution therein; and
    treating the at least one mating portion of the fiber optic connector by applying the solution thereto, the solution being configured to reduce the insertion force of the at least one mating portion, wherein the at least one mating portion of the fiber optic connector is selected from the group consisting of a ferrule bore, a ferrule alignment pin and combinations thereof.

2. The method of claim 1, wherein the insertion force for the fiber optic connector after about fifty mating cycles is about 2 pounds of force or less after treating.

3. The method of claim 1, wherein the solution includes an index matching lubricant.

4. The method of claim 1, wherein the solution includes a lubricant and a cleaner.

5. The method of claim 4, wherein the lubricant is a silicone oil and the cleaner is an alcohol.

6. The method of claim 1, wherein the at least one mating portion includes a ferrule bore and treating includes inserting a cleaning element into the ferrule bore.

7. The method of claim 1, wherein the at least one mating portion includes a ferrule bore and treating includes spraying the solution into the ferrule bore.

8. The method of claim 1, further including wiping a ferrule face of the fiber optic connector clean after treating.

9. A method for treating a mating portion of a fiber optic connector for reducing an insertion force for the mating portion, the method comprising:
    providing at least one mating portion of a fiber optic connector;
    mating a cleaning assembly to the at least one mating portion, the cleaning assembly having a solution therein, wherein the at least one mating portion of the fiber optic connector is selected from the group consisting of a ferrule bore, a ferrule alignment pin and combinations thereof; and
    treating the at least one mating portion of the fiber optic connector by applying the solution thereto, the solution being configured to reduce the insertion force of the at least one mating portion, wherein the insertion force for the fiber optic connector after treating is about 2 pounds of force or less.

10. The method of claim 9, wherein the solution includes an index matching lubricant.

11. The method of claim 10, wherein the lubricant is a silicone oil and further comprising an alcohol.

12. The method of claim 9, wherein the at least one mating portion is a ferrule bore and treating includes inserting a cleaning element into the ferrule bore, spraying the solution into the ferrule bore and combinations thereof.

13. The method of claim 9, further including wiping a ferrule face of the fiber optic connector after treating.

* * * * *